(12) United States Patent
Schwartz

(10) Patent No.: US 11,187,441 B2
(45) Date of Patent: Nov. 30, 2021

(54) CONTROL SYSTEM FOR AN ELECTROCALORIC DEVICE

(71) Applicant: Palo Alto Research Center Incorporated, Palo Alto, CA (US)

(72) Inventor: David E. Schwartz, Concord, MA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 234 days.

(21) Appl. No.: 16/598,582

(22) Filed: Oct. 10, 2019

(65) Prior Publication Data

US 2021/0108832 A1 Apr. 15, 2021

(51) Int. Cl.
*F25B 21/00* (2006.01)

(52) U.S. Cl.
CPC ........ *F25B 21/00* (2013.01); *F25B 2321/001* (2013.01); *F25B 2600/00* (2013.01)

(58) Field of Classification Search
CPC ................ F25B 21/00; F25B 2321/001; F25B 2600/00; F25B 49/00; F25B 2700/21; Y02B 30/00
See application file for complete search history.

(56) References Cited

U.S. PATENT DOCUMENTS

| 8,760,177 B2 | 6/2014 | Ezekiel |
| 9,429,344 B2* | 8/2016 | Schwartz ................ F25B 21/00 |
| 9,739,512 B2 | 8/2017 | Rao |
| 10,107,527 B2* | 10/2018 | Radcliff .................. F25B 9/145 |
| 2017/0045258 A1 | 2/2017 | Annapragada et al. |
| 2019/0003746 A1 | 1/2019 | Wei et al. |

FOREIGN PATENT DOCUMENTS

EP 2957843 5/2016

OTHER PUBLICATIONS

European Search Report from EP Application No. 2018837.5 dated May 3, 2021, 7 pages.

* cited by examiner

*Primary Examiner* — Ana M Vazquez
(74) *Attorney, Agent, or Firm* — Mueting Raasch Group

(57) ABSTRACT

A method for operating an electrocaloric system includes determining an internal temperature lift of an electrocaloric device. A current temperature of a space to be cooled is determined. A heat rejection temperature is determined. A difference between the current temperature and the heat rejection temperature is determined. A target temperature lift is determined based on the difference and a target temperature for the space. A voltage applied to the electrocaloric device is modulated based on the internal temperature lift and the target temperature lift.

22 Claims, 7 Drawing Sheets

CONTROL SYSTEM FOR AN ELECTROCALORIC DEVICE

TECHNICAL FIELD

This disclosure relates generally to electrocaloric devices and to systems and methods related to such devices.

BACKGROUND

In recent years, several technologies have been investigated for heat pump, air conditioning, and/or other energy conversion applications. These technologies include the use of electrocaloric energy conversion which may lead to enhanced energy efficiency, compactness, noise level, as well as a reduction in environmental impact.

BRIEF SUMMARY

Embodiments described herein involve a method for operating an electrocaloric system comprising determining an internal temperature lift of an electrocaloric device. A current temperature of a space to be cooled is determined. A heat rejection temperature is determined. A difference between the current temperature and the heat rejection temperature is determined. A target temperature lift is determined based on the difference and a target temperature for the space. A voltage applied to the electrocaloric device is modulated based on the internal temperature lift and the target temperature lift.

Embodiments involve an electrocaloric system, comprising an electrocaloric device. A voltage source is configured to apply a voltage to the electrocaloric device. A controller is configured to measure an internal temperature lift of the electrocaloric device. A current temperature of a space to be cooled is determined. A heat rejection temperature is determined. A difference between the current temperature and the heat rejection temperature is determined. A target temperature lift is determined based on the difference and a target temperature for the space. A voltage applied to the electrocaloric device is modulated based on the internal temperature lift and the target temperature lift.

Embodiments involve an electrocaloric system, comprising an electrocaloric device. A voltage source is configured to apply a voltage to the electrocaloric device at a switching frequency. A controller is configured to measure a rate of temperature change of one or more of an electrocaloric device and the rate of temperature change of the space. A heat load of a space to be cooled is determined based on the measured rate of temperature change. A switching frequency of the electrocaloric device is modulated based on the heat load of the space to be cooled.

The above summary is not intended to describe each embodiment or every implementation. A more complete understanding will become apparent and appreciated by referring to the following detailed description and claims in conjunction with the accompanying drawings.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The electrocaloric effect and/or the pyroelectric effect refers to a reversible temperature and/or entropy change of a dielectric material upon application of an electric field. An electrocaloric device may be formed as the dielectric of a capacitor, either single or multilayer. Application of a voltage to the capacitor generates an electric field across the electrocaloric material leading to a temperature increase. When the field is removed, the temperature decreases. Alternately coupling the electrocaloric capacitor to a heat source and heatsink synchronously with application of the voltage can generate a temperature difference between the source and sink. Use of multiple electrocaloric capacitors coupled to one another, either discretely or as a continuum, allows generation of a temperature gradient larger than the adiabatic temperature change of a single electrocaloric capacitor.

Materials such as polymers, bulk ceramics, thin-film ceramics, and/or other materials have exhibited an electrocaloric effect and or a pyroelectric effect Capacitors that may be used in an electrocaloric system can include electrocaloric dielectric materials such as ceramics including $BaTiO_3$, lanthanated lead zirconate titanate (PLZT), and/or $PbBa-ZrO_3$, polymers, including poly(vinyledene fluoride-trifluoroethylene-) (P(VDF-TrFE)) copolymer or poly(vinyledene fluoride-trifluoroethylene-chlorofluoroethylene) (P(VDF-TrFE-CFE)) terpolymer, and/or polymer-ceramic composites.

Embodiments described herein may be used in electrocaloric cooling systems such as in refrigerators, heat pumps, and/or other coolers. As another example, embodiments described herein can be capable of exhibiting a pyroelectric effect. The electrocaloric effect and the pyroelectric effect refer to the same phenomenon: a change in the temperature of a material associated with a changing electric field. Systems that exhibit the pyroelectric effect may be useful for implementing a heat engine and/or a temperature sensor, for example. While, embodiments described herein mostly discuss the use of an electrocaloric device for cooling. It is to be understood that any of the systems and/or methods herein may be used in a device configured to heat a space.

Figure 1A:
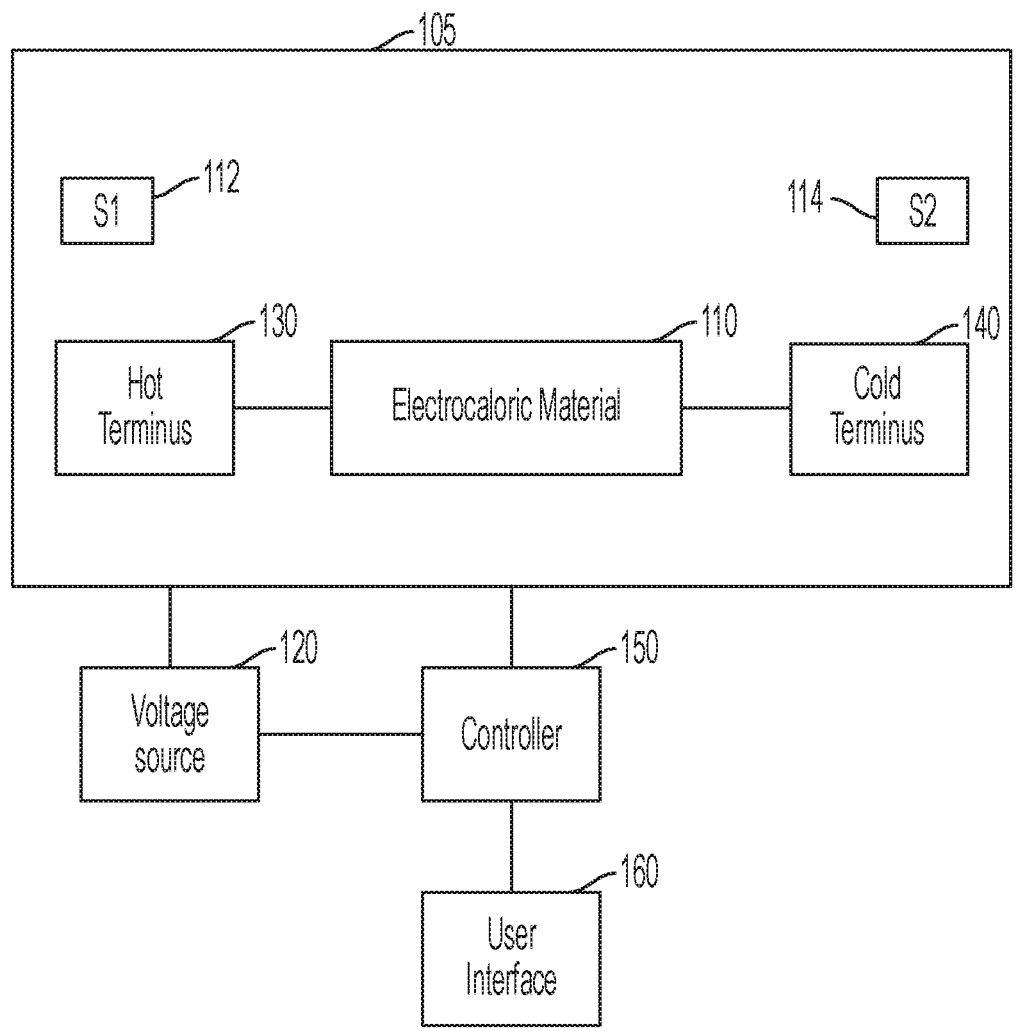
FIG. 1A shows an example electrocaloric system in accordance with embodiments described herein.

FIG. 1A shows an example electrocaloric system in accordance with embodiments described herein. The electrocaloric device 105 includes an electrocaloric material 110 that may be coupled to a heat source 130 and/or a heatsink 140. According to embodiments described herein, the electrocaloric material 110 is not connected to the heat source 130 and the heatsink 140 at the same time such that the electrocaloric alternately connected to the heat source 130 and the heatsink 140. Different electrocaloric system designs may be used. For example, the electrocaloric device may use fluid flow to generate a temperature gradient. The fluid may be continuously coupled to the heat source and the heatsink.

A voltage source 120 is coupled to a controller 150 and the electrocaloric device 105 and is configured to apply a voltage to the electrocaloric device. According to embodiments described herein, the voltage source 120 is configured to operate at a switching frequency. The switching frequency may be determined based on factory settings and/or on parameters of the electrocaloric device 105 and/or on the space to be cooled. For example, the switching frequency may be modulated based on a desired efficiency and/or cooling power.

The electrocaloric device 105 may have one or more sensors 112, 114 that are configured to measure various parameters of the system. For example, at least one sensor 112, 114 may be configured to measure a temperature of the electrocaloric device 105. According to embodiments described herein, a first sensor 112 may be configured to measure a temperature of the hot side of the electrocaloric device 105. For example, the first sensor 112 may be located on a side of the electrocaloric device 105 that is proximate the hot terminus 130. The hot terminus 130 may be proximate to a heatsink such as the heat rejection space and/or fluid, for example. A second sensor 114 may be configured to measure a temperature of the cold side of the electrocaloric device 105. For example, the second sensor 114 may be located on a side of the electrocaloric device 105 that is proximate the cold terminus 140. The cold terminus 140 may be proximate to a heat source such as the object and/or space to be cooled, for example. While FIG. 1 shows two sensors, it is to be understood that more or fewer sensors can be used and/or sensors may be located in locations other than those shown.

The controller 150 is coupled to the electrocaloric device 105 and is configured to control one or more of the components of the system. For example, the controller 150 may be configured to control the voltage applied to the electrocaloric material 110 by the voltage source 120. According to some embodiments, the controller 150 may be configured to control connection of the heat source 130 and/or the heatsink 140 to the electrocaloric material 110. A user interface 160 may be coupled to the controller 150 and may be used by the controller 150 to control the various aspects of the electrocaloric device 110.

Figure 1B:
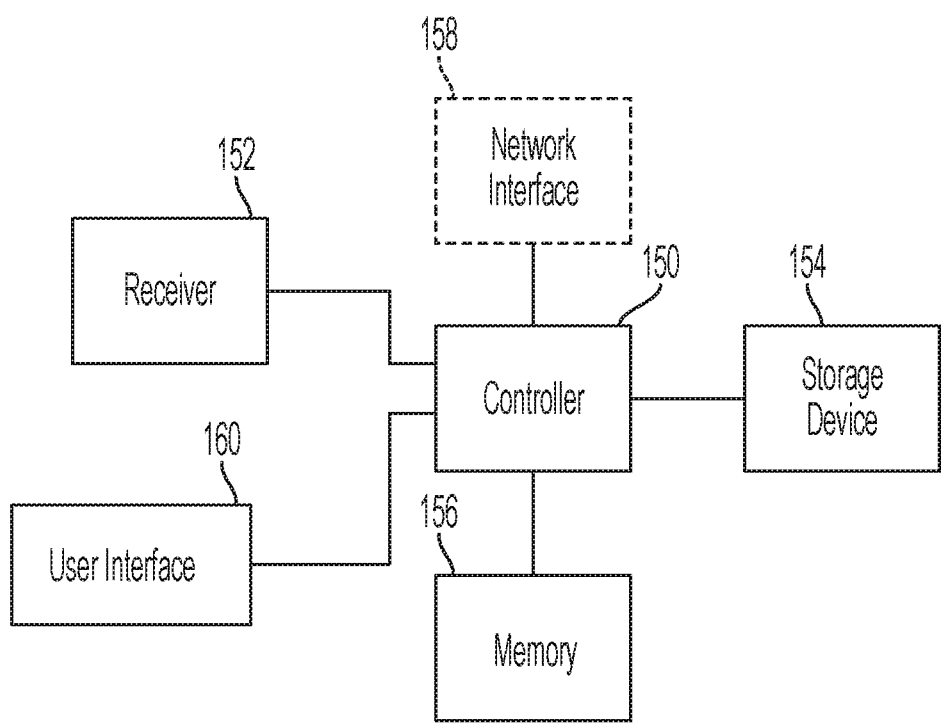
FIG. 1B illustrates a control system configured to control an electrocaloric device in accordance with embodiments described herein.

FIG. 1B shows a more detailed view of a control system configured to control the electrocaloric device 105 in accordance with embodiments described herein. The controller 150 may include any type of type of device capable of executing instructions. For example, the controller 150 may include one or more of a central processing unit (CPU), a graphical processing unit (GPU), a field-programmable gate array (FPGA), and an application-specific integrated circuit (ASIC). The controller 150 may be coupled to a receiver 152 configured to receive instructions related to the control of the electrocaloric device 105. For example, the receiver may be configured to receive target temperatures for a space via the user interface 160, for example. Computer program instructions may be stored in a storage device 154 and loaded into memory 156 when execution of a control process is desired. Thus, the steps of the methods described herein may be defined by the computer program instructions stored in the memory 156 and controlled by the controller 150 executing the computer program instructions. According to embodiments described herein, the controller 150 may perform method steps as part of a server or cloud-based service. The system may include one or more network interfaces 158 for communicating with other devices via a network. The system also includes other input/output devices, such as a thermostat, that enables user interaction with the computer (e.g., display, keyboard, mouse, speakers, buttons, etc.). FIGS. 1A and 1B are high level representations of possible components of a an electrocaloric system for illustrative purposes and the system may include other components.

A desirable feature of a heat pump may be to operate at high efficiency. Most cooling technology are optimized for certain conditions—a certain cooling load, e.g., capacity, and temperature lift. The system efficiency typically decreases as the target temperature lift decreases below an optimal maximum. For example, with a fixed target indoor temperature of 72° F., an air conditioner designed for an outdoor temperature of 95° F., might operate less efficiently when the outdoor temperature is only 80° F. as the temperature lift has been reduced from 23 F to 8° F. Furthermore, many systems, including many vapor compression air conditioning and refrigeration systems, do not have the capability to modulate the system temperature lift and instead turn on and off based on the temperature relative to a set point. At the same time, variable control is becoming more and more commonplace in newer systems, attesting to the desirability of the higher efficiency that it enables.

Figure 2:
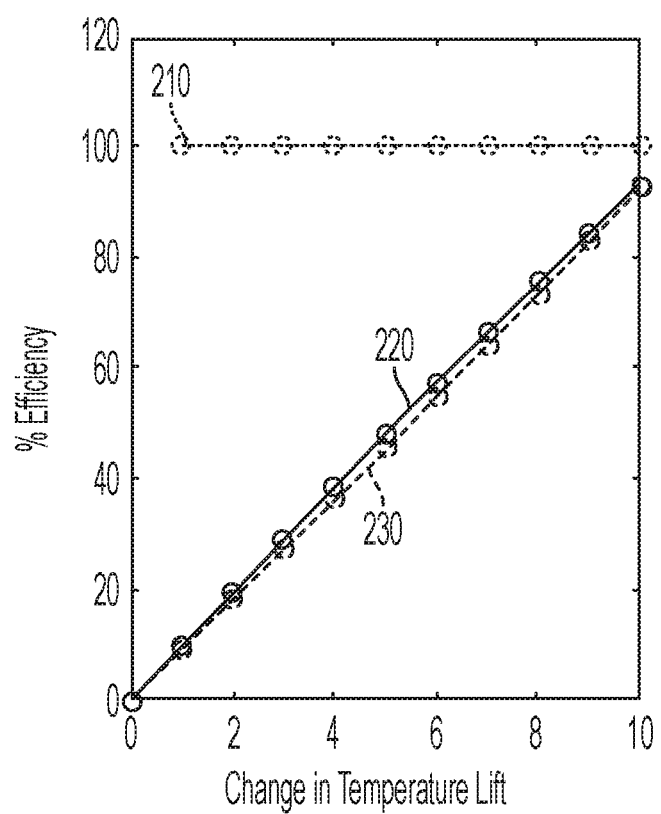
FIG. 2 shows a modeled system efficiency versus the target temperature lift for an internal system temperature lift of 10 degrees for Brayton, Carnot, and modified Otto cycles in accordance with embodiments described herein.

The efficiency of an electrocaloric cooler being operated on a Brayton cycle (with two isoelectric and two isentropic stages), a modified Otto cycle (with a zero-voltage stage, a constant charge stage, and two isentropic stages), and/or other types of cycles, may be dependent on the difference between the internal system temperature lift and the target temperature lift. FIG. 2 shows a modeled system efficiency relative to the thermodynamic (Carnot) maximum as a function of target temperature lift for an internal system temperature lift of 10 degrees for Brayton 230, Carnot 210, and modified Otto 220 cycles. The Brayton cycle is a preferred cycle as it is the simplest to implement yet it has a strong dependence on target temperature.

Figure 3:
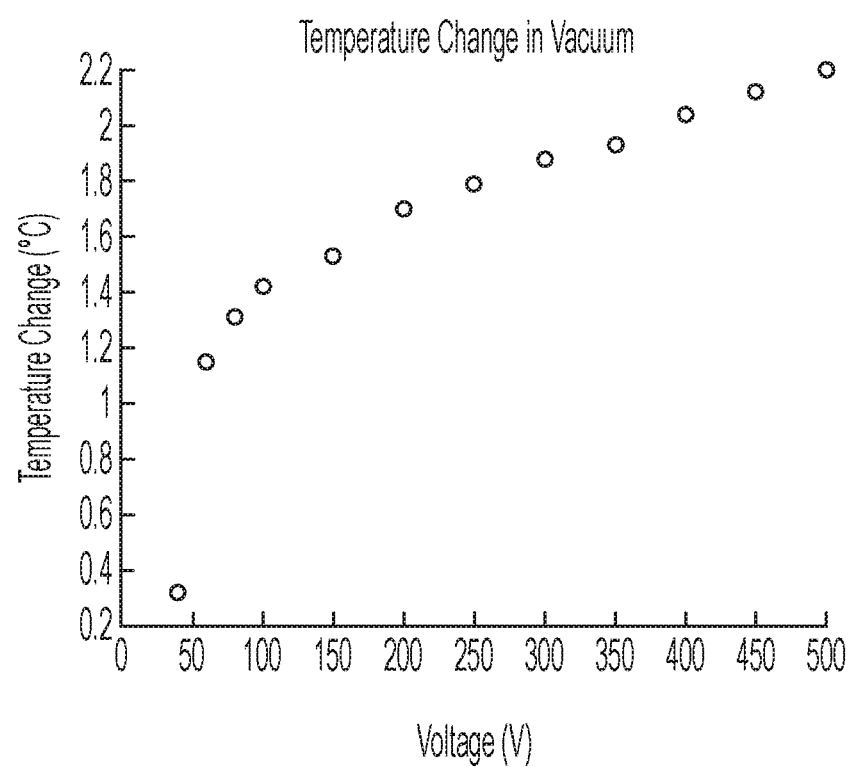
FIG. 3 illustrates that the adiabatic temperature change of an electrocaloric material is a strong function of applied field in accordance with embodiments described herein.

Embodiments described herein provide a means of operating an electrocaloric cooler and/or a heat pump to maintain high efficiency as the target temperature lift changes. This is done by varying the voltage applied to the electrocaloric capacitors as a function of the target temperature lift. The adiabatic temperature change of an electrocaloric material is a strong function of applied field with higher voltages inducing higher temperature changes. As an example, FIG. 3 shows the measured adiabatic temperature change for a $Pb(Sc,Ta)O_3$ (PST) electrocaloric multilayer capacitor versus the applied voltage.

By reducing the applied voltage to the electrocaloric capacitors as the target temperature lift decreases, high efficiency can be maintained. Note that the electrocaloric system temperature lift will be the combined temperature lift of individual electrocaloric capacitors in a cascade, or of a gradient across a continuous electrocaloric "regenerator". The optimal internal temperature lift will not be exactly the same as the target temperature lift of the application as there are temperature drops associated with heat exchange between the electrocaloric cooler and the ambient environment (or whatever environment is to be cooled) as well as between individual electrocaloric capacitor units themselves.

Figure 4:
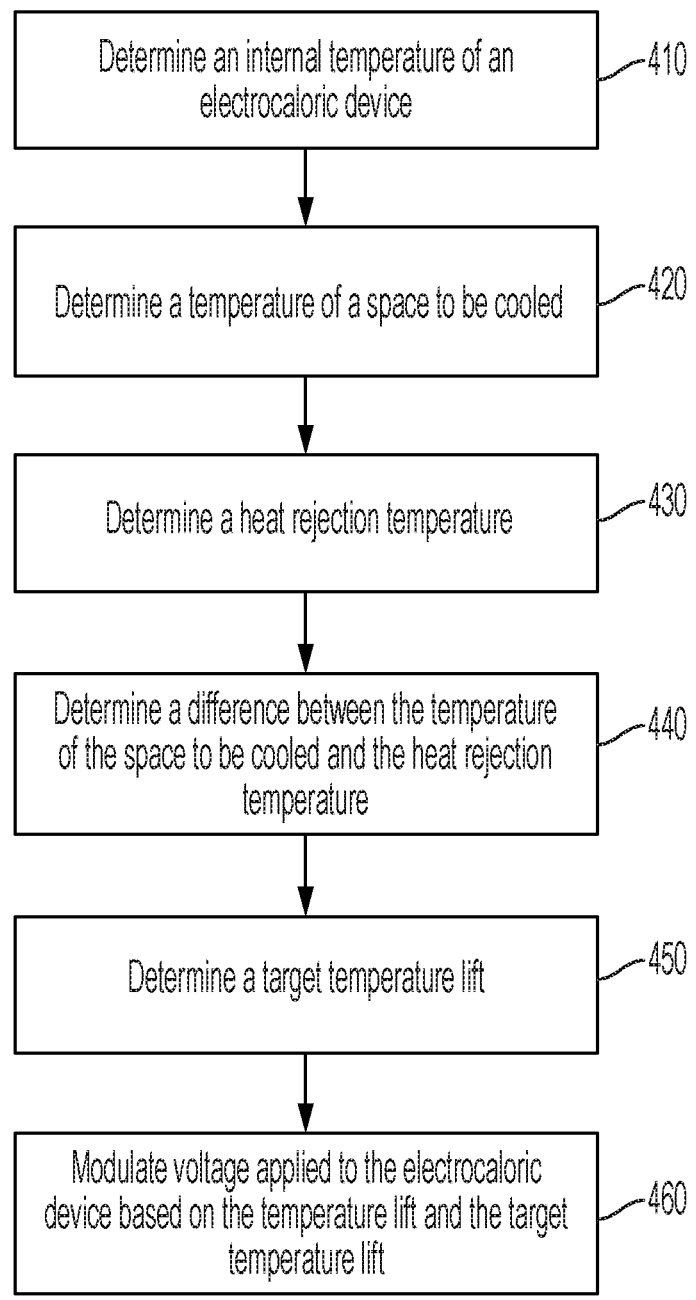
FIG. 4 shows a process for controlling an electrocaloric device to maintain a high efficiency in accordance with embodiments described herein.

FIG. 4 shows a process for controlling an electrocaloric device to maintain a high efficiency in accordance with embodiments described herein. An internal temperature lift of an electrocaloric device is determined 410. The internal temperature lift may depend on how many elements are in the device and/or on the amount of heat being pumped. The internal temperature lift can be estimated based on known parameters and an assumed heat pumping power. For example, the internal temperature lift may be determined by finding a difference between a temperature on the hot side of the electrocaloric device and a temperature on the cold side of the electrocaloric device. The temperatures may be measured using sensors as described in conjunction with FIG. 1.

According to embodiments described herein, the total system internal temperature lift depends on how many elements are in the device and/or the amount of heat being pumped. The internal temperature lift may be estimated based on known parameters and an assumed heat pumping power. Determining the internal temperature lift may include determining the internal temperature lift based on one or more of the heat load of the space to be cooled and a voltage applied to the electrocaloric device. According to various implementations, the internal temperature lift is determined based on a voltage applied to the electrocaloric device. A heat capacity of the device may be used to improve the determined estimate of the internal temperature lift.

A current temperature of a space to be cooled is determined 420. This may be done by using one or more sensors located in the space to be cooled. For example, the current temperature of the space to be cooled may be determined 430 using temperature sensors inside a refrigerator, inside an air conditioned vehicle and/or room, and/or inside a cooled electronic device. According to various implementations, the current temperature of the space to be cooled is determined by measuring a temperature of heat exchange fluid and/or a temperature of a heat exchanger coupled to an electronic device, for example.

A heat rejection temperature is determined 430. The heat rejection temperature may be determined 430 by measuring a temperature at a location where heat is rejected, e.g., the hot side of the system. For example, the heat rejection temperature may be determined 430 based on an outside temperature, a temperature behind a refrigerator, and/or a temperature on a heatsink. According to various embodiments, the heat rejection temperature is determined 430 based on current weather data and/or information received from a weather station. A difference between the heat rejection temperature and the current temperature of the space to be cooled is determined 440.

A target temperature lift is determined 450 based on the difference and the target temperature of the space to be cooled. The target temperature of the space to be cooled may be determined based on a thermostat coupled to the electrocaloric device. According to various implementations, the target temperature is based on a default temperature and/or on factory settings. According to various implementations, the target temperature lift comprises determining a difference between a thermostat setpoint and the heat rejection temperature.

At least one voltage applied to the electrocaloric device is modulated 460 based on the internal temperature lift and the target temperature lift. According to various embodiments, modulating the voltage applied to the electrocaloric device comprises setting a switching voltage on the electrocaloric device such that the measured internal temperature lift is greater than or substantially equal to the target temperature lift.

Figure 5:
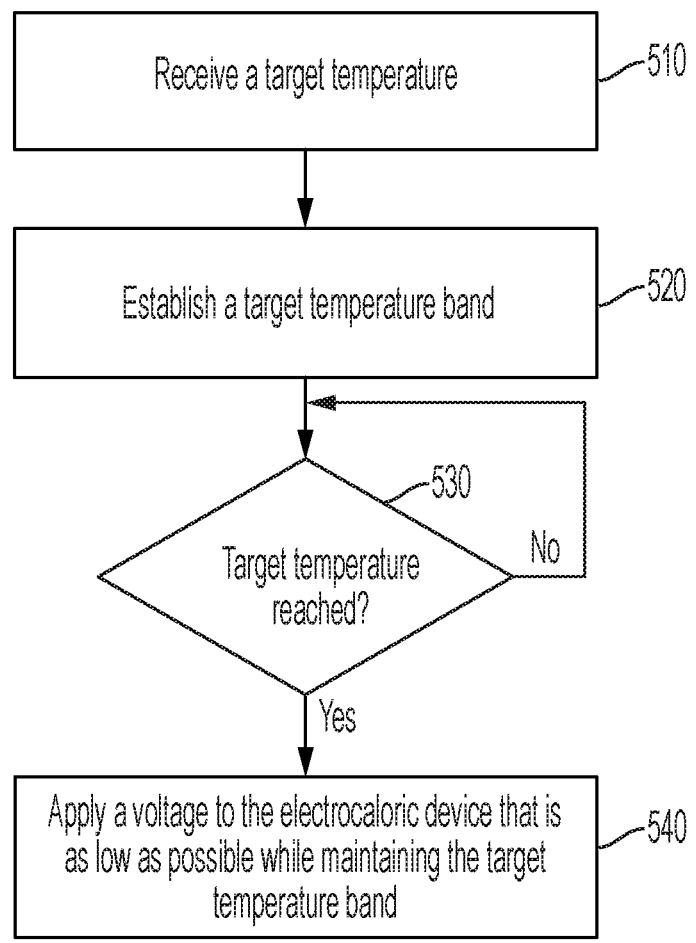
FIG. 5 illustrates a process for keeping the temperature in a target temperature band once the target temperature has been reached in accordance with embodiments described herein.

According to embodiments described herein, once a target temperature is reached, the system operates to keep the temperature in a target temperature band as shown in FIG. 5. A target temperature is received 510. This may be based on user input from a thermostat or a factory setting, for example. A target temperature band is established 520. The target temperature band may be based on one or more of a user input and factory settings. It is determined 530 whether the target temperature has been reached. If it is determined 530 that the target temperature has not been reached, the system continues to check whether the target temperature has been reached. If it is determined 530 that the target temperature has been reached, a voltage is applied 540 to the electrocaloric device that is as low as possible while maintaining the target temperature band.

There may be times when faster cooling and/or heating may be desired. Providing this faster cooling and/or heating may be done with or without sacrificing efficiency. If the target temperature lift is greater than a threshold the system may initiate a faster cooling and/or heating process until the target temperature lift is within a predetermined range. According to various embodiments, the system can receive input from a user interface. For example, a user may be able to request faster cooling and/or heating using a thermostat. Once the request for faster cooling and/or heating is received, a switching voltage applied to the electrocaloric material may be increased up to a maximum voltage, for example. According to embodiments described herein, the maximum voltage may be a factory setting. The system may operate using the higher switching voltage until a target temperature and/or temperature band is reached.

Figure 6:
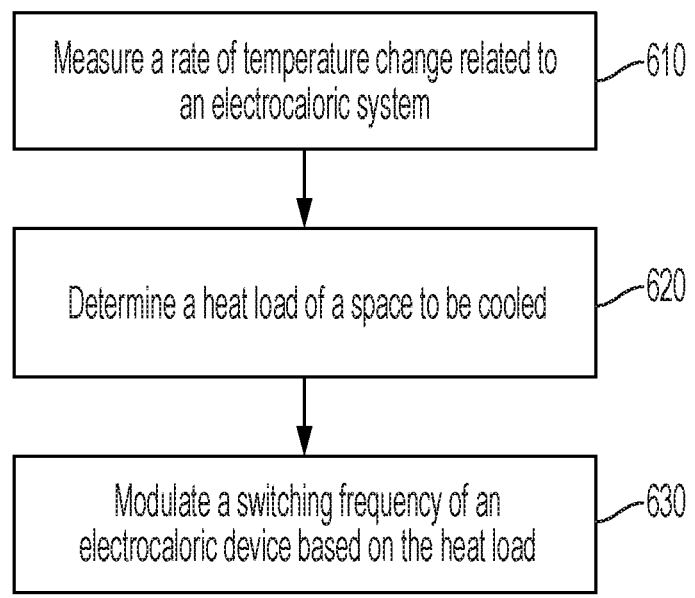
FIG. 6 shows a process for modulating a switching frequency of the electrocaloric device in accordance with embodiments described herein.

The switching frequency of the electrocaloric device may also be modulated to increase an efficiency of the device based on a heat load, for example. FIG. 6 shows a process for modulating a switching frequency of the electrocaloric device in accordance with embodiments described herein. A rate of temperature change of one or more of an electrocaloric device and the rate of temperature change of the space is measured 610. This may be done by using temperature sensors in and/or on the electrocaloric device and/or temperature sensors in the space to be cooled. A heat load of the space to be cooled is determined 620 based on the measured rate of temperature change. The switching frequency of the electrocaloric device is modulated 630 based on the heat load of the space to be cooled.

According to embodiments described herein, the switching frequency of the electrocaloric device is modulated before and/or after the target temperature is reached. According to various embodiments, the switching frequency is modulated concurrently with modulating the voltage applied to the electrocaloric device. In some implementations, the switching frequency is modulated separately from the voltage modulation.

As described herein, there may be times when faster cooling and/or heating may be desired. For example, a user may be able to request faster cooling and/or heating using a thermostat. Once the request for faster cooling and/or heating is received, a switching frequency applied to the electrocaloric material may be increased. The switching frequency may be increased up to a maximum switching frequency. The maximum switching frequency may be a factory setting, for example. The maximum operating frequency may be based on the maximum switching frequency that can be maintained while providing sufficient cooling capacity. The system may operate using the higher frequency until a target temperature and/or temperature band is reached. After the target temperature is reached, a switching frequency of the electrocaloric device is maintained that is as low as possible while maintaining the target temperature band.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A method for operating an electrocaloric system, comprising:
    determining an internal temperature lift of an electrocaloric device;
    determining a current temperature of a space to be cooled;
    determining a heat rejection temperature;
    determining a difference between the current temperature and the heat rejection temperature;
    determining a target temperature lift based on the difference and a target temperature for the space; and
    modulating a voltage applied to the electrocaloric device based on the internal temperature lift and the target temperature lift.

2. The method of claim 1, wherein determining the internal temperature lift of the electrocaloric device comprises measuring at least two temperatures at different locations of the electrocaloric device.

3. The method of claim 1, wherein determining the internal temperature lift of the electrocaloric device is based on the voltage applied to the electrocaloric device.

4. The method of claim 1, wherein determining the heat rejection temperature comprises measuring a temperature at a location that heat is rejected.

5. The method of claim 1, wherein determining the heat rejection temperature comprises determining the heat rejection temperature based on current weather data.

6. The method of claim 1, wherein determining the target temperature lift comprises determining a difference between a thermostat setpoint and the heat rejection temperature.

7. The method of claim 1, wherein modulating the voltage applied to the electrocaloric device comprises setting a switching voltage on the electrocaloric device such that the determined internal temperature lift is greater than or substantially equal to the target temperature lift.

8. The method of claim 1, further comprising:
    receiving an input from a user indicating that fast cooling is requested; and
    increasing a switching voltage based on the user input.

9. The method of claim 1, further comprising:
    establishing a target temperature band; and
    after the target temperature is reached, applying a voltage to the electrocaloric device that is as low as possible while maintaining the target temperature band.

10. The method of claim 9, wherein the target temperature band is based on one or more of factory settings and user input.

11. The method of claim 1, further comprising determining a heat load of the space to be cooled.

12. The method of claim 11, wherein determining the heat load of the space comprises measuring a rate of temperature change of one or more of the electrocaloric device and a rate of temperature change of the space.

13. The method of claim 11, further comprising, modulating a switching frequency of the electrocaloric device based on the heat load of the space to be cooled.

14. The method of claim 13, wherein modulating the switching frequency comprises modulating an operating frequency after the target temperature is reached.

15. The method of claim 13, wherein modulating the switching frequency is done concurrently with modulating the voltage applied to the electrocaloric device.

16. The method of claim 11, further comprising:
    receiving an input from a user indicating that fast cooling is requested; and
    increasing a switching frequency of the electrocaloric device based on the user input.

17. The method of claim 11, further comprising:
    establishing a target temperature band; and
    after the target temperature is reached, maintaining a switching frequency of the electrocaloric device that is as low as possible while maintaining the target temperature band.

18. The method of claim 11, wherein determining the internal temperature lift comprises determining the internal temperature lift based on one or more of the heat load of the space to be cooled and the voltage applied to the electrocaloric device.

19. An electrocaloric system, comprising:
    an electrocaloric device;
    a voltage source configured to apply a voltage to the electrocaloric device; and
    a controller configured to:
        determine an internal temperature lift of the electrocaloric device;
        determine a current temperature of a space to be cooled;
        determine a heat rejection temperature;
        determine a difference between the current temperature and the heat rejection temperature;
        determine a target temperature lift based on the difference and a target temperature for the space; and
        modulate the voltage applied to the electrocaloric device based on the internal temperature lift and the target temperature lift.

20. The electrocaloric system of claim 19, further comprising a user interface configured to receive input from a user.

21. The electrocaloric system of claim 19, wherein the controller is configured to modulate the voltage applied to the electrocaloric device by setting a switching voltage on the electrocaloric device such that the determined internal temperature lift is greater than or substantially equal to the target temperature lift.

22. An electrocaloric system, comprising:
an electrocaloric device;
a voltage source configured to apply a voltage to the electrocaloric device at a switching frequency; and
a controller configured to:
   measure a rate of temperature change of one or more of an electrocaloric device and a rate of temperature change of a space to be cooled;
   determine a heat load of the space to be cooled based on the measured rate of temperature change; and
   modulate the switching frequency of the electrocaloric device based on the heat load of the space to be cooled.

* * * * *